March 17, 1970     K. A. DOUTT     3,501,157
PISTON ROD SEAL FOR HYDRAULIC PISTON AND CYLINDER ASSEMBLIES
Filed May 18, 1967
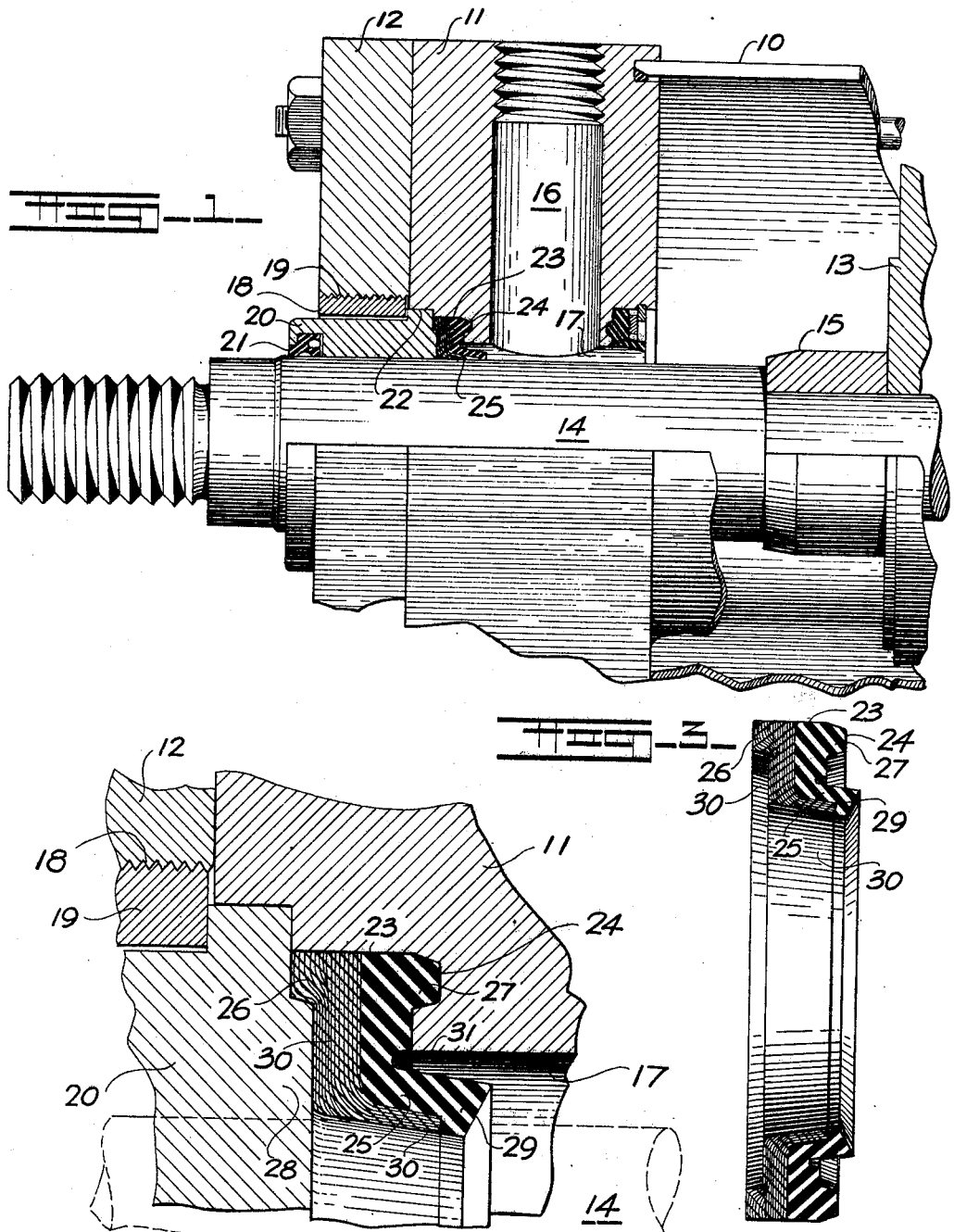
INVENTOR.
Kingsley A. Doutt
BY
ATTORNEY.

United States Patent Office 3,501,157
Patented Mar. 17, 1970

3,501,157
PISTON ROD SEAL FOR HYDRAULIC PISTON AND CYLINDER ASSEMBLIES
Kingsley A. Doutt, 115 Maple St., Alpena, Mich. 49707
Filed May 18, 1967, Ser. No. 643,792
Int. Cl. B65d 53/00; F16j 9/00, 15/00
U.S. Cl. 277—168     1 Claim

ABSTRACT OF THE DISCLOSURE

A piston rod seal for a hydraulic piston and cylinder assembly having a piston rod bushing arranged to receive said seal, said piston rod seal comprising an annular one-piece member integrally formed of resilient material having a thick lip portion extending along the piston rod and a configuration such that the sealing relation of the lip portion is unaffected by distortion of the piston rod seal resulting from high fluid pressures directed thereagainst.

---

The principal object of the invention is the provision of a piston rod seal for a hydraulic piston and cylinder assembly incorporating an improved configuration which will retain its seated sealing relation in the cylinder assembly and relative to the piston rod when fluid pressure engaging the same causes distortion thereof.

A further object of the invention is the provision of a piston rod seal of novel configuration for installation in a hydraulic piston and cylinder assembly and arranged so that the seal may be clampingly secured in position therein.

Those skilled in the art will observe that in hydraulic piston and cylinder constructions it is essential that a sealing member such as a gasket, be provided in the cylinder bushing through which the piston rod of the hydraulic piston and cylinder assembly is reciprocably positioned. In the past such piston rod seals as they are termed, have generally comprised more or less conventional gasket constructions formed of resilient material and frequently comprising packing rings and sometimes taking the form of various shaped gaskets and packing rings usable for the intended purpose. Such piston rod seals are notoriously ineffective in maintaining a fluid tight sealing relation between the movable piston rod and the cylinder head and gland in the bushing through which it passes, as distortion of the piston rod seals usually results in the hydraulic fluid moving the rod seal and displacing it relative to its engagement with the piston rod and/or the cylinder head and gland or bushing as the case may be. In the past such piston rod seals have required frequent replacement.

The present invention relates to an improved piston rod seal which takes the form of an annular member of integral composite construction including fabric plies and resilient rubber-like material so arranged that a major portion of the piston rod seal is relatively rigid while the remainder thereof is resilient, and with the lip portion thereof engaged about the piston rod being largely resilient but including several fabric plies which lend a degree of rigidity to a portion thereof engaging said piston rod.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a side elevation of a portion of a hydraulic piston and cylinder assembly with parts broken away and parts in cross-section, and illustrating the piston rod seal in location therein.

FIGURE 2 is an enlarged detail of the piston rod seal and portions of the hydraulic piston and cylinder assembly seen in FIGURE 1 of the drawing.

FIGURE 3 is a medial sectional view through the piston rod seal.

By referring now to FIGURE 1 of the drawing, it will be seen that a hydraulic piston and cylinder assembly has been disclosed which includes a cylinder 10 and a cylinder head 11 secured in sealing relation to one end of the cylinder 10, as will be understood by those skilled in the art. A clamp head 12 is positioned adjacent the cylinder head 11 and tensioning means engage the clamp head 12 and extend to an opposite cylinder head at the other end of the cylinder 10 (not shown). A piston 13 is positioned within the cylinder 10 on a piston rod 14 which piston rod 14 includes an annular enlarged portion 15 comprising a cushioning element.

The cylinder head 11 includes a fluid passageway 16 formed therein which communicates with a central bore 17 in the cylinder head 11 through which the piston rod 14 extends to a point exteriorly of the clamp head 12.

A bushing construction is secured to the cylinder head 11 by means of the clamp head 12 and includes a clamping ring 18 threadably positioned in a central threaded aperture 19 in the clamp head 12, so as to position a gland 20 which is apertured for the reception of the piston rod 14, as will be understood by those skilled in the art. A wiping seal 21 is mounted in an annular recess in the gland 20 adjacent its outermost end, and the innermost end of the gland 20 is provided with an annular flange 22 against which the innermost surface of the clamping ring 18 is engaged so that the gland 20 may be moved axially of the piston rod 14 thereby.

The cylinder head 11 has an annular recess 23 formed therein relative to the central bore 17 therein, and which annular recess 23 includes an annular groove 24 in a side wall of said annular recess 23. A piston rod seal comprising a thick annular L-shaped T-headed body member 25 including oppositely disposed outwardly extending annular flanges 26 and 27 as formed by the T-headed configuration, is clampingly secured between the inner end of the gland 20 and the cylinder head 11 so that the annular flange 26 on the piston rod seal body member 25 extends above an annular shoulder 28 of reduced diameter formed on the innermost end of the gland 20, as best seen in enlarged detail in FIGURE 2 of the drawing, and so that the annular flange 27 on the piston rod seal body member 25 extends into the annular groove 24 in the cylinder head 11. The piston rod seal 25 is preferably formed of a plurality of fabric plies and rubber-like material, and as best seen in FIGURE 2 of the drawing, about half of the piston rod seal and all of the annular flange 26 are formed of the vertical extending fabric plies bonded together by the rubber-like material while the other half of the piston rod seal 25 and all of the annular flange 27 thereof, are formed of the rubber-like material. These respective ply and rubber-like portions of the piston rod seal comprise respectively the left and right halves thereof, as seen in the cross-section of the piston rod seal in FIGURE 2 of the drawing. The thick annular lip portion of the piston rod seal which directly engages the piston rod 14 is indicated by the numeral 29 and it will be observed that its larger peripheral edge is outwardly of its smaller edge which engages the piston rod 14 and that the edge of the lip portion 29 is therefore formed on an outward angle providing an increased bulk of material that resists distortion away from the piston rod 14.

The fabric plies are indicated by the numeral 30, and those skilled in the art will observe that the integrally formed piston rod seal including the fabric plies 30 and the resilient rubber-like material are vulcanized or otherwise integrally bonded to form a unitary structure. The configuration of the piston rod seal is important in the ability of the seal to perform efficiently in its environment, as hereinbefore described, and particularly when it is subjected to the very high pressures of hydraulic fluid directed thereagainst.

Those skilled in the art will be familiar with the fact that piston rod seals of the prior art have very frequently distorted under such pressures and pulled loose from their mounting and/or assumed such shapes a to be ineffective in sealing against the piston rod. In the present invention the configuration of the piston rod seal is such that it performs effectively over a long period of time and avoids down time which in production equipment is so costly in production man hours and loss of production.

Specifically, the critical configuration including the thick lip 29 partially separated from the larger annular portion thereof by an annular channel 31 formed therein immediately above the thick annular lip 29, permits the distortion of the larger annular portion of the seal without moving the thick lip 29 away from the piston rod 14.

In FIGURE 2 of the drawing the piston rod seal cross-section is shown in its as installed configuration and without the presence of the piston rod 14 which is shown in broken lines. At such time as the piston rod 14 is positioned in its normal relation in the environment the lip 29 will move vertically from the position shown to conform with the circular exterior of the piston rod 14 and to bring the annular lip 29 under stress as the same is both moved outwardly and distorted by the piston rod 14. The annular groove 31 also provides for this distortion and at the same time insures that the configuration of the piston rod seal is such that the presence of hydraulic fluid under extremely high operating pressure against the outer surfaces of the lip 29 will not distort the same and as a matter of fact, will insure its proper positioning with respect to the piston rod 14 as well as the head 11 and gland 20.

The principal objects of the invention are thereby achieved by the particular piston rod seal disclosed herein, and having thus described my invention, what I claim is:

1. A piston rod seal for a hydraulic piston and cylinder assembly including a cylinder head and a gland therefor, said piston rod seal comprising a thick annular cross-sectional L-shaped T-headed body member including oppositely projecting annular flanges on its outer periphery and a laterally projecting thick annular lip of uniform thickness on its inner periphery in spaced relation to the annular flange adjacent thereto and defining therebetween a planar annular surface, said body member having an annular groove formed therein radially spacing the inner peripheral edge of the annular surface from said thick annular lip and said lip projecting axially at least twice the distance of the adjacent projecting flange, the inner and outer surfaces of said thick annular lip being normally frusto-conical and converging outwardly of said body member and terminating in an edge which has a reverse taper whereby there is no thinning away of the material of the flange which would permit upward pressure of the hydraulic fluid to distort the end of the flange.

References Cited

UNITED STATES PATENTS

| | | | |
|---|---|---|---|
| 2,596,703 | 5/1952 | Maier | 92—258 X |
| 2,656,229 | 10/1953 | Stillwagon | 277—205 X |
| 3,285,616 | 11/1966 | Doutt | 277—189 X |
| 2,145,884 | 2/1939 | Leman | 277—212 |
| 2,431,221 | 11/1947 | Allen | 277—212 |
| 2,825,590 | 3/1958 | Sutherland | 277—212 |
| 3,190,702 | 6/1965 | Flick. | |

SAMUEL ROTHBERG, Primary Examiner

U.S. Cl. X.R.

277—205